Jan. 30, 1962
C. F. AMBROZ
3,018,545
DEVICE FOR ALIGNING OPERATING LINKAGE
OF HYDRAULIC TURBINE WICKET GATE
Filed May 27, 1957
2 Sheets-Sheet 2
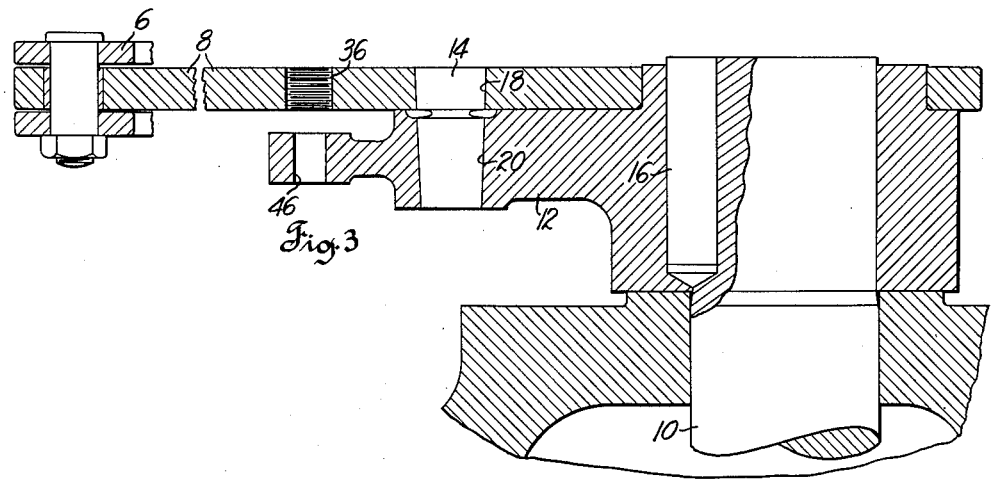
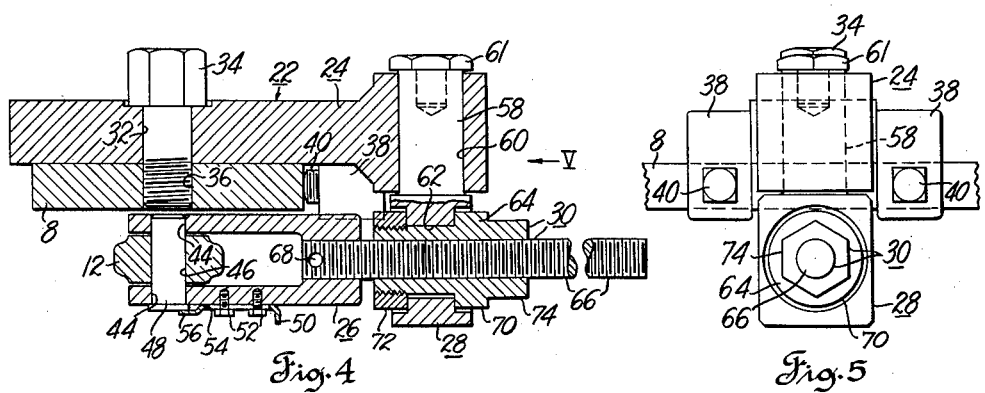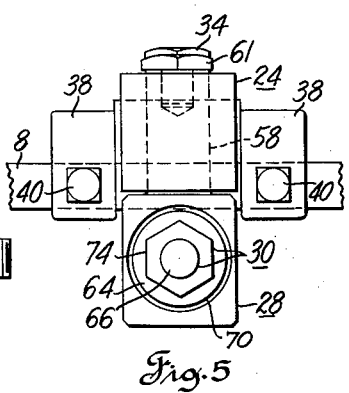
Inventor
Charles F. Ambroz
by Arthur M. Steink
Attorney United States Patent Office 3,018,545
Patented Jan. 30, 1962

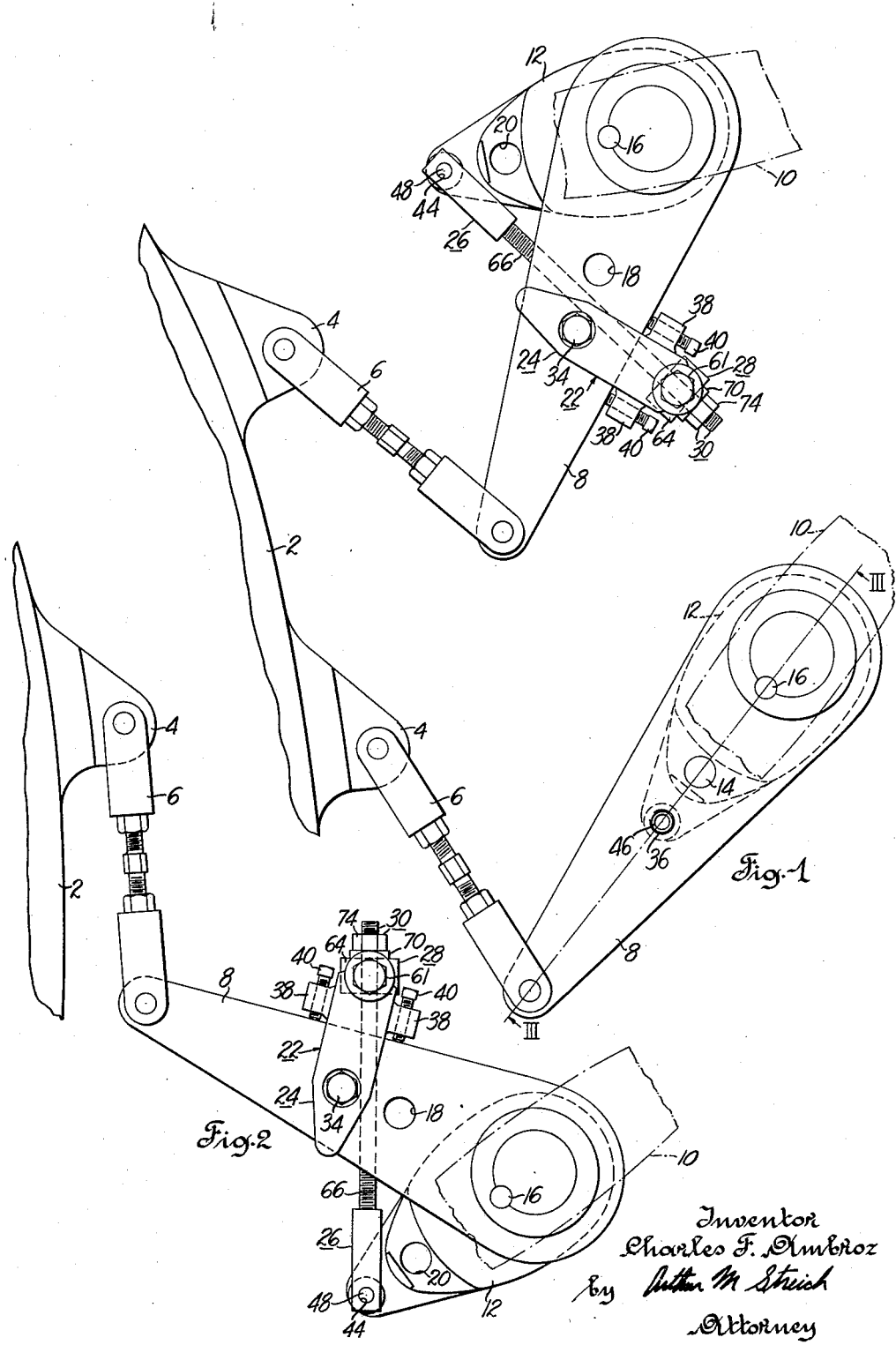

3,018,545
DEVICE FOR ALIGNING OPERATING LINKAGE OF HYDRAULIC TURBINE WICKET GATE
Charles F. Ambroz, Milwaukee, Wis., assignor to Allis-Chalmers Manufacturing Company, Milwaukee, Wis.
Filed May 27, 1957, Ser. No. 661,851
7 Claims. (Cl. 29—256)

This invention relates to the wicket gates employed on a hydraulic turbine, and more particularly to a tool that makes it easy to rotate a disconnected wicket gate of the turbine, so that a shear pin that has been severed can be replaced in the linkage that moves the wicket gate.

A hydraulic turbine has a series of wicket gates around its impeller. The wicket gates are rotated to control the flow of water to the impeller in accordance with the load on the turbine.

As is conventional, a governor controls servomotors that turn a gate operating ring. The wicket gates are connected to and rotated by the gate operating ring. Each wicket gate is individually connected to the gate operating ring by a linkage.

The linkage includes a lever moved by the gate operating ring, and a lever fixed to the wicket gate. These two levers are connected together by a shear pin. The levers rotate the wicket gate in response to turning of the gate operating ring.

A shear pin is provided in the linkage to (a) prevent injury to the wicket gates if they should become blocked, and (b) disconnect the blocked wicket gate from the gate operating ring so the gate operating ring can continue to control the other wicket gates.

When a shear pin is severed, it is difficult to replace a new shear pin. This is because the lever that is fixed to the wicket gate is no longer in alignment with the lever that is moved by the gate operating ring, and it is difficult to realign these two levers.

Before my invention it was necessary to shut down the turbine to replace the shear pin. The water flows from the dam through a penstock to the turbine. It has been necessary to either close the butterfly valve in the penstock, or if no butterfly valve, close the head gates at the dam to shut off the supply of water to the turbine. Then it was necessary to operate the servomotors that turn the gate operating ring, to move the lever moved by the gate operating ring until it is aligned with the lever fixed to the wicket gate. Once the levers are aligned the new shear pin could then be inserted. It is expensive to shut down the turbine, and it is difficult to align the two levers by using the servomotors.

This invention provides a simple device which permits a severed shear pin to be safely replaced while the unit is operating at any blocked gate opening (i.e. the governor that controls the servomotors is blocked so the linkage moved by the gate operating ring will not be unexpectedly shifted during use of the tool).

Essentially, the tool of the present invention comprises a tool that has one part attached to the lever moved by the gate operating ring, and another part attached to the lever fixed to the wicket gate shaft. The tool then rotates one lever relative to the other lever to align the two levers.

It is an object of this invention to provide a tool that rotates the lever connected to the wicket gate to align it with the lever that is moved by the gate operating ring, so a new shear pin can be replaced without shutting down the turbine.

Other objects and advantages will appear from the following description considered in conjunction with the attached drawings, in which:

FIG. 1 is a plan view of a portion of a hydraulic turbine, showing one of the wicket gates with a shear pin that has been severed, and the tool applied to the wicket gate that has the severed shear pin;

FIG. 2 is a view similar to FIG. 1, showing how the tool is used when the wicket gate is in a different position than that shown in FIG. 1;

FIG. 3 is a cross section of FIG. 1 taken in the direction of arrows III—III illustrating a section of the linkages used to move a wicket gate;

FIG. 4 is a sectional view of the tool shown in FIGS. 1 and 2; and

FIG. 5 is an end view of the tool taken in the direction of the arrow V of FIG. 4.

Referring to FIGS. 1, 2 and 3, there is disclosed a portion of the mechanism used in a hydraulic turbine to move the wicket gates. As is conventional, a gate operating ring 2 is rotated by a pair of servomotors (not shown) controlled by a governor (not shown). Each ear 4 on gate operating ring 2 is pivotally connected to a link 6, which is pivotally connected to first lever 8. First lever 8 (see FIG. 3) is mounted so it can rotate relative to a wicket gate 10. First lever 8 is connected to second lever 12 by shear pin 14. Second lever 12 is keyed to wicket gate 10 by key 16. First lever 8 and second lever 12, which are connected together by shear pin 14, rotate wicket gate 10 in response to turning of the gate operating ring.

Shear pin 14 (FIG. 3) is tapered and fits in a complementary tapered opening 18 in first lever 8, and also extends into a complementary tapered opening 20 in second lever 12.

Under normal conditions, gate operating ring 2 when turned, moves link 6 and rotates first lever 8, second lever 12 and wicket gate 10.

Occasionally something will block a wicket gate and prevent it from being rotated by the gate operating ring. When this happens, gate operating ring 2 will rotate first lever 8 relative to second lever 12 and sever shear pin 14.

A wicket gate, when its shear pin has been severed, is free to drift between an open position (illustrated at the top of FIG. 1) and a closed position (illustrated in FIG. 2).

The tool of this invention is used to align shear pin opening 18 in first lever 8 with shear pin opening 20 in second lever 12. The tool can be used no matter what position the wicket gate is in.

The tool 22 illustrated in FIGS. 4 and 5 comprises broadly four parts: (1) first support 24 that is connected to first lever 8, (2) second support 26 that is pivotally connected to second lever 12, (3) reaction member 28 pivotally carried by first support 24, and (4) force means 30, having one end connected to reaction member 28 and its other end connected to second support 26, to move second lever 12 relative to first lever 8.

Means are provided to fix first support 24 to first lever 8. In the embodiment disclosed, the means comprises opening 32, provided intermediate the ends of first support 24, and bolt 34. Bolt 34 is inserted through opening 32 and threaded into an opening 36 (FIGS. 3 and 4) provided in first lever 8 for reception of bolt 34.

First support 24 also carries a positioning member that locks first support 24 in place on either side of first lever 8, and prevents first support 24 from being turned about bolt 34. The positioning member comprises an extension 38 carried on each side of first support 24, and a set screw 40 carried by each extension 38. Each set screw 40 engages the side of first lever 8 to cooperate with bolt 34 and lock first support 24 in position.

Second support 26 is yoke shaped and contains circular openings 44. An opening 46 (FIGS. 3 and 4) is provided in second lever 12 for cooperation with openings 44. Second support 26 is pivotally connected to second lever 12 by a connecting means.

The connecting means comprise a pivot pin 48 which fits into circular openings 44 and 46, of second support 26 and second lever 12, and a sliding catch 50 that holds pivot pin 48 in place.

Sliding catch 50 is supported on second support 26 by two screws 52. The sliding catch has a groove 54 so that it can be moved relative to screws 52. An offset portion 56 is provided on said catch member to engage the end of pivot pin 48 to maintain the pivot pin in place.

Reaction member 28, supported by first support 24, has a shaft 58 at one end that rotates in a socket 60 provided in the end of first support 24. A cap 61 is threaded into the end of shaft 58 to prevent shaft 58 from falling out of socket 60. An opening 62 is also provided in reaction member 28 to which force means 30 is connected.

Force means 30 that is connected to second support 26 and reaction member 28 comprises a rotatable internally threaded bushing 64 supported in opening 62 of reaction member 28, and a threaded shaft 66 connected to second support 12.

One end of threaded shaft 66 is pinned at 68 to second support 26 so threaded shaft 66 cannot rotate. The other end of threaded shaft 66 is received by threaded bushing 64.

Threaded bushing 64 is provided with first shoulder 70 (FIG. 4) on one side of the periphery of opening 62, and nut 72 on the other side of the periphery of opening 62. Shoulder 70 and nut 72 form abutments to prevent bushing 64 from moving axially, forcing the threaded shaft to move axially through bushing 64.

In the embodiment disclosed, bushing 64 (FIG. 5) is provided with a hexagonal head 74 to receive a wrench. However, other devices can be employed to rotate bushing 64. For example, bushing 64 could be rotated by a motor (not shown).

The tool operates in the following manner:

First, the governor is blocked so the linkage that moves the wicket gates will not be unexpectedly shifted during use of the tool. Then first support 24 is placed on first lever 8. Bolt 34 is inserted through opening 32 in first support 24 and threaded into opening 36 in first lever 8. Set screws 40 are extended until they engage the side of first lever 8 to lock first support 24 in position and prevent it from being turned about bolt 34.

Threaded shaft 66 is extended by rotating internally threaded bushing 64. This moves second support 26 outwardly. Since second support 26 can also be rotated relative to first support 24, second support 26 can be easily moved to align circular openings 44 with circular opening 46 in second lever 12.

When circular openings 44 in second support 26 are aligned with circular opening 46 in second lever 12, pivot pin 48 is inserted through openings 44, 46 to pivotally lock the members together. Sliding catch 50 is then moved across the end of pin 48 to lock the pin in place.

All that is necessary now is merely that a wrench be applied to hexagonal head 74 of threaded bushing 64 to rotate the bushing and force threaded shaft 66 to rotate second lever 12 and wicket gate 10 until shear pin opening 20 in second lever 12 is aligned with shear pin opening 18 in first lever 8.

Once openings 18 and 20 are aligned, a new shear pin 14 can be inserted to again lock levers 8 and 12 together.

In summary, this invention provides a simple tool that rotates the lever connected to a wicket gate to align it with the lever that is moved by the gate operating ring, so that a new shear pin can be replaced without shutting down the turbine.

Although but a single embodiment of the present invention has been illustrated and described, it will be apparent to one skilled in the art that various changes and modifications may be made therein without departing from the spirit of the invention or from the scope of the appended claims.

What is claimed is:

1. In a tool for providing relative rotation between a first lever connected to a gate operating ring of a hydraulic turbine and a second lever that is fixed to a wicket gate, to align a shear pin opening in said first lever with a shear pin opening in said second lever, the combination comprising: a first support having a socket at one end and an opening intermediate its ends, a bolt extending through said opening and adapted to be threaded into said first lever to attach said first support to said first lever, said first support including two extensions, said extensions extending from opposite sides of said support, and a set screw carried by each extension, each set screw adapted to engage against said first lever to position said support with respect to said first lever and prevent said first support from turning about said bolt, a yoke shaped second support having circular openings, said yoke shaped second support adapted to straddle said second lever, a pivot pin, said pivot pin adapted to pass through said circular openings in said yoke shaped second support and said circular opening in said second lever, to pivotally connect said yoke shaped second support to said second lever, a sliding catch carried by said second support, said sliding catch having an offset portion that engages the end of said pivot pin to maintain said pivot pin in position, a reaction member, said reaction member including a shaft rotatably received in said socket of said first support, an internally threaded bushing, said reaction member also including an opening that rotatably receives said internally threaded bushing, abutments on said internally threaded bushing that abut the periphery of said opening in said reaction member and prevent said bushing from moving axially, said shaft of said reaction member pivotally supporting said internally threaded bushing, a threaded shaft extending through said internally threaded bushing, said threaded shaft rigidly fixed to said yoke shaped second support, said internally threaded bushing, when rotated, moving said threaded shaft axially relative to said internally threaded bushing, said threaded shaft and said internally threaded bushing cooperating to relatively rotate said second lever and said first lever to align said shear pin opening in said first lever with said shear pin opening in said second lever.

2. In a tool for providing relative rotation between a first lever moved by a gate operating ring of a hydraulic turbine and a second lever that is fixed to a wicket gate, to align a shear pin opening in said first lever with a shear pin opening in said second lever, the combination comprising: a first support; means adapted to rigidly connect said first support to said first lever; a second support, said first and second supports lying in nonintersecting planes; means adapted to pivotally connect said second support to said second lever; a reaction member pivotally connected to said first support, said reaction member connection being on the remote side of said rigid connection relative to said pivotal connection of said second support to said second lever when said shear pin openings are out of alignment; and force transmitting means connecting said second support to said reaction member, the connection of said force transmitting means to said reaction member being in the plane of said second support.

3. In a tool for providing relative rotation between a first lever moved by a gate operating ring of a hydraulic turbine and a second lever that is fixed to a wicket gate, to align a shear pin opening in said first lever with a shear pin opening in said second lever, the combination comprising: a first support having a flat surface on one side thereof adapted to engage said first lever; means adapted to fix said first support to said first lever with said first support engaging surface making surface contact with said first lever; a positioning member carried by said first support adapted to abut said first lever and prevent said first support from turning about said fixing means; a second support arranged entirely on said engaging surface side of said first support and in parallel spaced apart relation with said first support; means adapted to pivotally connect said second support to said second lever; a reaction member pivotally connected to said first support with the pivotal axis perpendicular to said flat engaging surface and located on one side of the abutting plane of said positioning member, said one side being the side of said plane opposite the first lever; and force transmitting means connected to said second support and to said reaction member, said force transmitting means relatively rotating said second lever and said first lever to align said shear pin opening in said first lever with said shear pin opening in said first lever with said shear pin opening in said second lever.

4. A tool as set forth in claim 3, wherein said positioning member includes two extensions, said extensions extending from opposite sides of said support, and a set screw carried by each extension to abut said first lever.

5. A tool as set forth in claim 3 wherein said second support is a yoke shaped member which straddles said second lever, said yoke shaped member having circular openings adapted to cooperate with a circular opening in said second lever, and said connecting means adapted to pivotally connect said second support to said second lever includes a pin member and a sliding catch member, said pin member adapted to pass through said circular openings in said yoke shaped member and said circular opening in said second lever, to pivotally connect said yoke shaped member to said second lever, and said sliding catch member slidably carried by said yoke shaped member so it can engage the end of said pin member to retain said pin member in place.

6. A tool as set forth in claim 3 wherein said reaction member is pivotally connected to said first support by a shaft that is pivotally received in a socket provided in said first support, said reaction member supporting said transmitting force means so said transmitting means can pivot relative to said first support.

7. A tool as set forth in claim 3 wherein said transmitting force means connected between said second support and said reaction member comprises: a rotatable bushing threaded internally and rotatably supported by said reaction member, and a threaded shaft extending through said threaded bushing and rigidly fixed to said second support, said bushing when rotated, moving said threaded shaft axially.

References Cited in the file of this patent
UNITED STATES PATENTS

| | | |
|---|---|---|
| 1,968,557 | Johanson | July 31, 1934 |
| 2,001,239 | Buckendale | May 14, 1935 |
| 2,113,755 | Billington | Apr. 12, 1938 |
| 2,376,375 | Mizer | May 22, 1945 |
| 2,539,831 | Hacker | Jan. 30, 1951 |
| 2,664,620 | Beasley | Jan. 5, 1954 |
| 2,677,174 | Lee | May 4, 1954 |
| 2,679,091 | Stratton | May 25, 1954 |